Patented Aug. 19, 1941

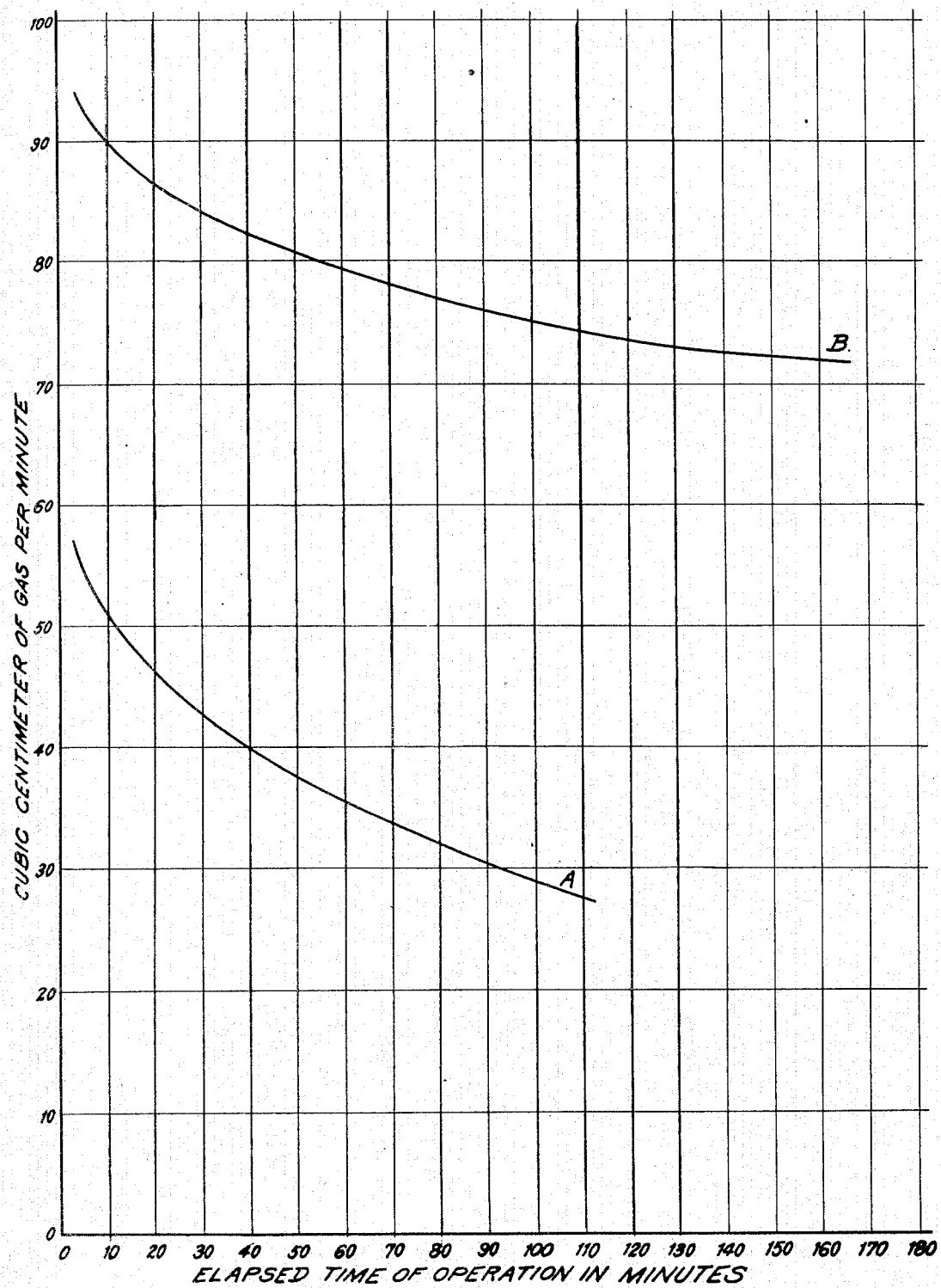

2,252,842

UNITED STATES PATENT OFFICE 2,252,842

TREATMENT OF HYDROCARBONS

Harold Fehrer, Nutley, N. J., assignor to Process Management Company, Inc., New York, N. Y., a corporation of Delaware Application November 3, 1938, Serial No. 238,518

3 Claims. (Cl. 260—668)

This invention relates to the process of changing the carbon-hydrogen ratio of hydrocarbons by dehydrogenation reactions.

More particularly to the invention relates to the thermal treatment of hydrocarbons, in the presence of a catalyst in which an active ingredient consists of a mixture of oxides of chromium and tin, to change the carbon-hydrogen ratio thereof.

In carrying out the process, for example, in the dehydrogenation of a paraffin hydrocarbon, the hydrocarbon is passed over the catalyst, preferably in the gaseous or vaporous state, at an elevated temperature. The temperature employed depends somewhat upon the nature of the hydrocarbon or hydrocarbons under treatment. Ordinarily, however, in the practice of the present invention a suitable temperature within the range of 350°–650° C. may be employed. The time of contact will depend upon the nature of the materials undergoing treatment, the temperature employed, and the degree of hydrogenation or dehydrogenation desired. For example, in the treatment of heptane at 475° C. a reaction time of a few seconds only is sufficient to effect simple dehydrogenation. However, if it is desired to effect cyclization and the production of aromatic compounds, a longer reaction time is necessary.

Chromium oxide is an active catalyst for hydrogenation-dehydrogenation reactions if prepared by a suitable method, for example, by precipitating the oxide in the form of a gel which is dried to form the catalyst. However, in accordance with the present invention, it has been found that the addition of an oxide of tin to the chromium oxide appears to amplify and stabilize the activity of the catalyst whereby the loss in activity occurs at a much lower rate during the passage of the hydrocarbon over the catalyst.

The improved catalyst of the present invention may be prepared as follows:

Preparation I.—80 grams of chromium acetate are dissolved in 400 cc. of distilled water at 25° C. To this solution is added a solution of 6.1 grams of stannic chloride pentahydrate in 40 cc. of water. After an hour, 85 cc. of concentrated ammonium hydroxide solution are added with vigorous stirring. The solution is then let stand until a voluminous gelatinous precipitate forms. Substantially complete precipitation is effected in about twenty hours. The precipitate is washed, preferably to the point of incipient peptization and then slowly dried to 300° C. The catalyst thus prepared is black and rather hard, and apparently consists of approximately 90% $Cr_2O_3$ and approximately 10% $SnO_2$. The dried material is granular in form and may be used as such or powdered and pelleted.

The foregoing example of the preparation of an improved chromium oxide catalyst is presented merely as an example which is susceptible of various modifications. The invention is not to be considered as limited to a method involving the use of the exact chromium and tin compounds above mentioned, or to a method employing the exact proportions of ingredients employed above.

The catalyst prepared as described above is extremely active in comparison with the catalyst prepared by the same method without the inclusion of a compound of tin.

To illustrate the superior activity of the improved catalyst a comparison of its activity with that of a chromium oxide catalyst similarly prepared is given in the attached drawing in which the curve A shows the rate of decrease in activity of the chromium oxide catalyst during the passage of heptane thereover and curve B shows the rate of decrease of activity of the chromium oxide-stannic oxide catalyst under the same conditions.

The chromium oxide catalyst was prepared by dissolving 100 grams of chromium acetate in 500 cc. of water, after which 100 cc. of concentrated ammonium hydroxide solution were added with stirring at room temperature. On standing the solution set to a stiff black jelly, from which the catalyst material was prepared by following the washing and drying procedure previously described.

The catalysts were tested by the passage thereover of heptane in vapor form at 475° C. Equal quantities of catalyst were used in each test and the heptane was passed over the catalyst mass at the same rate in each test. The activity of the catalyst was measured by measuring the rate of gas evolution, the gas being substantially all hydrogen.

Referring to the drawing, it will be noted that the curves represent the activity of the catalyst expressed in terms of cc. of gas evolved per minute at the end of various lengths of time after the initiation of the flow of heptane over the catalyst at the operating temperature. By comparison of curve A with curve B it will be noted that the initial activity of the chromium oxide catalyst is substantially lower than that of the chromium oxide-stannic oxide catalyst prepared in the same manner, and the activity of the chromium oxide catalyst declines at a faster rate than the chromium oxide-stannic oxide catalyst.

The use of promoters, addition agents, etc., for chromium oxide catalysts has been suggested previously. It has been found, however, in connection with the present invention, that the addition of tin oxide to a chromium oxide catalyst amplifies and stabilizes the activity of the catalyst to a much greater extent than is obtained with the use of other promoters which have been proposed specifically as addition agents for chromium oxide catalysts.

I claim:

1. The method of making aromatic hydrocarbons which comprises contacting an aliphatic hydrocarbon having the same number of carbon atoms per molecule as a desired aromatic hydrocarbon with a catalyst comprising as an active ingredient an intimate mixture of oxides of chromium and tin at elevated temperature for a time sufficient to effect cyclization of said aliphatic hydrocarbon and conversion thereof to an aromatic hydrocarbon having the same number of carbon atoms per molecule as the said aliphatic hydrocarbon.

2. The method of making aromatic hydrocarbons which comprises contacting an aliphatic hydrocarbon having the same number of carbon atoms per molecule as a desired aromatic hydrocarbon with a catalyst comprising as an active ingredient an intimate mixture of oxides of chromium and tin at elevated temperature for a time longer than that necessary to effect simple dehydrogenation to effect cyclization of said aliphatic hydrocarbon and conversion thereof to an aromatic hydrocarbon having the same number of carbon atoms per molecule as said aliphatic hydrocarbon.

3. The method of making aromatic hydrocarbons which comprises contacting an aliphatic hydrocarbon having the same number of carbon atoms per molecule as a desired aromatic hydrocarbon with a catalyst, comprising as an active ingredient an intimate mixture of chromium sesqui-oxide and stannic oxide produced by coprecipitation of said oxides in an aqueous solution, at elevated temperature for a time sufficient to effect cyclization of said aliphatic hydrocarbon and conversion thereof to an aromatic hydrocarbon having the same number of carbon atoms per molecule as said aliphatic hydrocarbon.

HAROLD FEHRER.